(No Model.)

W. BAUSCH.
EYEGLASSES AND SPECTACLES.

No. 572,670. Patented Dec. 8, 1896.

Witnesses;
Maurice W. Tuttle.
G. Willard Rich.

Inventor,
William Bausch
Church & Church
his atty's.

UNITED STATES PATENT OFFICE.

WILLIAM BAUSCH, OF ROCHESTER, NEW YORK, ASSIGNOR TO THE BAUSCH & LOMB OPTICAL COMPANY, OF SAME PLACE.

EYEGLASSES AND SPECTACLES.

SPECIFICATION forming part of Letters Patent No. 572,670, dated December 8, 1896.

Application filed August 1, 1896. Serial No. 601,348. (No model.)

*To all whom it may concern:*

Be it known that I, WILLIAM BAUSCH, of Rochester, in the county of Monroe and State of New York, have invented certain new and useful Improvements in Eyeglasses and Spectacles; and I do hereby declare the following to be a full, clear, and exact description of the same, reference being had to the accompanying drawings, forming a part of this specification, and to the reference-numerals marked thereon.

My invention relates to eyeglasses and spectacles, and has for its object to improve the construction of the portion resting upon the nose of the wearer, and more particularly adapted for the nose-pieces or the parts of eyeglasses that grasp the sides of the nose of the wearer, whereby the discomfort of wearing glasses of this description will be reduced to a minimum and they will be held more firmly in position; and to this end it consists in providing a bearing-surface for the bridge of spectacles and the nose-pieces of eyeglasses constructed of woven gauze or netting; and it further consists in improvements in construction, which will be hereinafter fully described and the novel features pointed out in the claims at the end of this specification.

Figure 1:
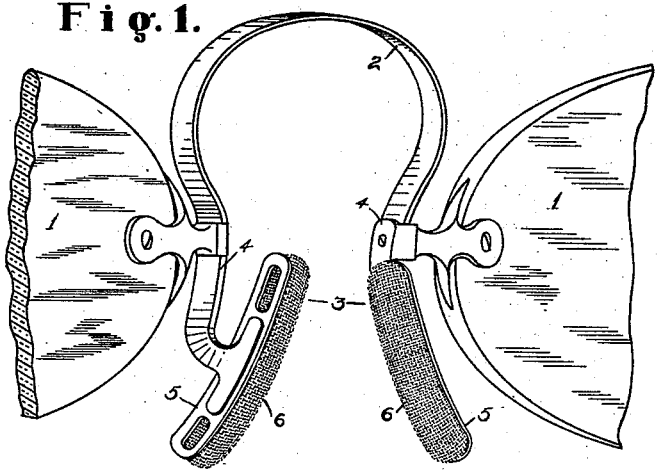
Figure 2:
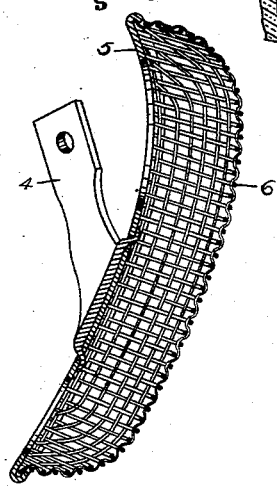
Figure 3:
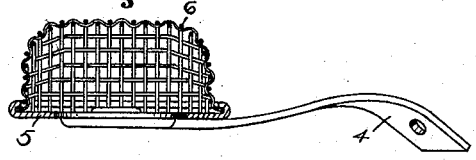
Figure 4:
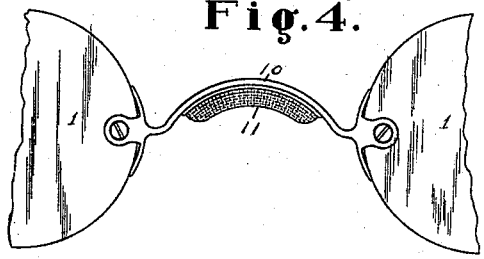

In the drawings, Figure 1 is a perspective view of a pair of eyeglasses provided with my improvements; Fig. 2, a sectional view of one of the nose-pieces removed; Fig. 3, a cross-sectional view of the same; Fig. 4, a view of a bridge-piece for spectacles.

Similar reference-numerals in the several figures indicate similar parts.

My improvement may be applied to any form of nose-piece, and in the drawings I have shown a pair of eyeglasses in which 1 represents the glasses, 2 the bow-spring, and 3 the nose-piece, embodying an attaching-shank 4, which in the present instance is formed separate from, but attached to, a base-plate 5, preferably provided with one or more perforations, as shown, and to the inner side of this plate is attached a bearing-piece 6, composed of fine-wire netting or gauze rounded outward, as shown, to form smooth edges and attached to the plate 5 either by soldering or by turning the edges of said plate over the netting, as shown in Fig. 3. The gauze bearing-surface 6 is preferably formed of fine gold or gold-plated wire, or, if desired, silver, aluminium, or other non-corrodible metal or material may be employed for the purpose.

Nose pieces or pads constructed in accordance with my invention are light and attractive in appearance and will firmly hold the glasses upon the wearer's nose by reason of the fact that the flesh will enter the interstices in the netting and prevent slipping even when there is an excess of oil in the skin of the wearer. The employment of the fine netting or gauze is advantageous, because an article readily obtainable, and, if desired, it may be shaped in suitable dies to the form shown, leaving a space between its under side and the supporting-plate 5, thus providing for ventilation and rendering the wearer less uncomfortable in warm weather than is the case where imperforate nose-pieces are employed.

In Fig. 4 I have shown a bridge-piece 10 for spectacles provided with a gauze bearing portion or surface 11, adapted to rest upon the wearer's nose, and, being cool and ventilated, it is a great improvement on the ordinary solid bridge, and the gauze will prevent the bridge from slipping on the nose, as the wire presents a series of projecting points, the interstices between which are open.

I claim as my invention—

1. A nose-piece for eyeglasses embodying a supporting-plate and a covering of woven netting or gauze adapted to contact with the nose of the wearer, substantially as described.

2. A nose-piece for eyeglasses embodying a perforated supporting-plate and a piece of woven gauze or netting rounded as shown and having its edges attached to the supporting-plate, said gauze being adapted to be brought in contact with the nose of the wearer, substantially as described.

3. In spectacles and eyeglasses a pad for resting on the wearer's nose and embodying a base-plate and a covering of fine woven gauze or netting attached thereto, substantially as described.

WILLIAM BAUSCH.

Witnesses:
J. HAMMELE,
W. V. KEIL.